(12) United States Patent
Kamiyama et al.

(10) Patent No.: US 8,941,932 B2
(45) Date of Patent: Jan. 27, 2015

(54) FRESNEL LENS

(75) Inventors: Haruki Kamiyama, Osaka (JP); Hideaki Fujita, Osaka (JP); Kazushi Fujioka, Osaka (JP); Hiroki Okuno, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/239,904

(22) PCT Filed: Jun. 15, 2012

(86) PCT No.: PCT/JP2012/065348
§ 371 (c)(1),
(2), (4) Date: Feb. 20, 2014

(87) PCT Pub. No.: WO2013/035404
PCT Pub. Date: Mar. 14, 2013

(65) Prior Publication Data
US 2014/0218810 A1    Aug. 7, 2014

(30) Foreign Application Priority Data
Sep. 9, 2011    (JP) .................................. 2011-197194

(51) Int. Cl.
G02B 3/08    (2006.01)
(52) U.S. Cl.
CPC ........................ G02B 3/08 (2013.01)
USPC ........................................................ 359/742

(58) Field of Classification Search
USPC .................................................. 359/742–743
See application file for complete search history.

(56) References Cited

U.S. PATENT DOCUMENTS

| 5,676,453 A | 10/1997 | Parkyn, Jr. et al. |
| 2008/0106804 A1 | 5/2008 | Ieda et al. |
| 2008/0204901 A1 | 8/2008 | Amano et al. |

FOREIGN PATENT DOCUMENTS

| JP | 11-504124 A | 4/1999 |
| JP | 2002-221605 A | 8/2002 |
| JP | 2007-79082 A | 3/2007 |
| JP | 2008-141152 A | 6/2008 |
| JP | 2009-258246 A | 11/2009 |

OTHER PUBLICATIONS

Official Communication issued in International Patent Application No. PCT/JP2012/065348, mailed on Oct. 9, 2012.

*Primary Examiner* — Scott J Sugarman
(74) *Attorney, Agent, or Firm* — Keating & Bennett, LLP

(57) ABSTRACT

A Fresnel lens includes an incident surface that is flat, and a prism-forming surface that has a plurality of prisms, the prism-forming surface being provided on the side of the Fresnel lens opposite to the incident surface. Each of the prisms has a converging surface that is located on the side away from the optical axis of the Fresnel lens.

4 Claims, 4 Drawing Sheets

FRESNEL LENS

TECHNICAL FIELD

The present invention relates to a Fresnel lens. More specifically, the present invention relates to a Fresnel lens including a refractive region that refracts incident light, and a reflective region that reflects incident light.

BACKGROUND ART

A Fresnel lens is a flat lens. A Fresnel lens is generally molded from transparent resin such as acrylic resin or polycarbonate resin, and thus has the advantage of allowing reductions in the thickness and weight of the lens. Accordingly, a Fresnel lens is widely used in lighting devices, displays, and light-receiving devices. A technique related to a conventional Fresnel lens is proposed in, for example, PTL 1. Japanese Unexamined Patent Application Publication No. 2002-221605 (PTL 1) proposes a technique in which the vertex of either one of refractive and reflective prisms from which light emerges with the higher intensity is designed in accordance with its distance from the optical axis.

CITATION LIST

Patent Literature

PTL 1: Japanese Unexamined Patent Application Publication No. 2002-221605

SUMMARY OF INVENTION

Technical Problem

A conventional Fresnel lens is designed to refract light emitted from a point light source into parallel rays. As the incidence angle at which light emitted from the point source is incident on the Fresnel lens becomes larger, it is necessary to make the refraction angle in the Fresnel lens larger. In a case where light emitted from a point light source and passing through a Fresnel lens is to be received by a light-receiving surface, when the angle of incidence on the converging surface of the lens becomes large, part of light undergoes total reflection at the converging surface and returns toward the light source. The light returning toward the light source cannot be received by the light-receiving surface, thus resulting in loss. Further, the total reflection at the converging surface causes part of light to emerge from the lens in a direction nearly perpendicular to the optical axis of the lens. The light emerging in such a direction cannot be received by the light-receiving surface, which also results in loss.

The present invention has been made in view of the above-mentioned problem, and accordingly, its main object is to provide a Fresnel lens that can minimize loss of light to improve the utilization efficiency of light.

Solution to Problem

A Fresnel lens according to the present invention includes an incident surface that is flat, and a prism-forming surface that has a plurality of prisms, the prism-forming surface being provided on a side of the Fresnel lens opposite to the incident surface. Each of the prisms has a converging surface that is located on a side away from an optical axis of the Fresnel lens. When a distance away from the optical axis in a radial direction of the Fresnel lens is defined as r, and predetermined values R1, R2, and R3 in the radial direction are set so as to satisfy R1<R2<R3, in at least a part of a region that satisfies $0 \leq r \leq R2$, light that passes through an interior of the Fresnel lens is refracted at the converging surface, and in at least a part of a region that satisfies $R2 < r \leq R3$, the light is reflected at the converging surface. In a range of $0 \leq r < R$, a relationship $\theta_2 = f(r)$ holds, and in a range of $R1 \leq r < R2$, a relationship $f(R1) \leq \theta_2 < f(r)$ holds, where $\theta_2$ represents an angle formed between the incident surface and the converging surface, and $f(x)$ represents a monotonically increasing function with x as a variable.

In the Fresnel lens mentioned above, preferably, a value of $\theta_2$ when $r=R2$ is larger than a value of $\theta_2$ when $r=R3$.

In the Fresnel lens mentioned above, preferably, each of the prisms has a diverging surface that is located on a side close to the optical axis, and a relationship $\theta_1 < 90°$ holds, where $\theta_1$ represents an angle formed between the incident surface and the diverging surface.

In the Fresnel lens mentioned above, preferably, directions opposite to each other along a straight line extending in the radial direction of the Fresnel lens are defined as an r direction and −r direction, and a relationship $\arctan\{f_1/(r+a)\}\theta_1 < 90°$ holds, where r represents a distance away from the optical axis in the r direction, $f_1$ represents a distance to the prism-forming surface from a light-emitting surface that emits incident light incident on the incident surface, and a represents a distance between the optical axis and an end portion of the light-emitting surface that is located farthest away from the optical axis in the −r direction.

Advantageous Effects of Invention

The Fresnel lens according to the present invention can minimize loss of light, thereby enabling improved utilization efficiency of light.

DESCRIPTION OF EMBODIMENTS

Hereinafter, an embodiment of the present invention will be described with reference to the figures. In the following figures, identical or equivalent portions are denoted by the same reference signs, and a description of those portions will not be repeated.

Figure 6:
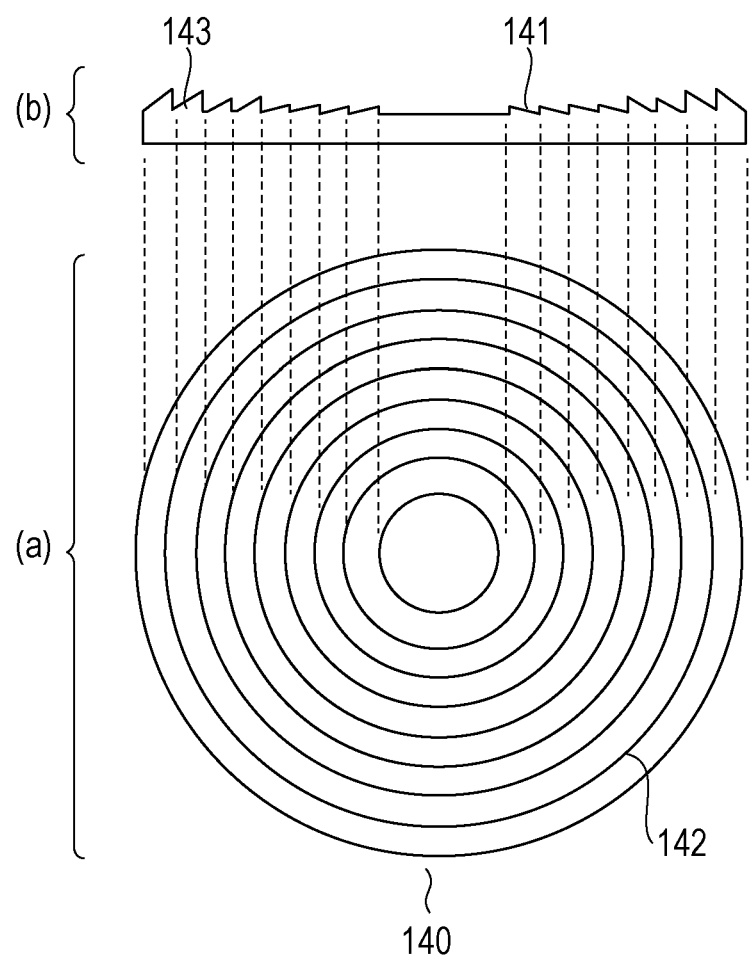
FIG. 6 schematically illustrates a configuration of a conventional Fresnel lens.

First, an example of a conventional Fresnel lens will be described. FIG. 6 schematically illustrates a configuration of a conventional Fresnel lens 140. FIG. 6(a) is a plan view of the Fresnel lens 140, and FIG. 6(b) is a cross-sectional view of the Fresnel lens 140. The conventional Fresnel lens 140 is not a spherical lens with a refracting surface 141 that is continuous, but is a flat lens whose refracting surface 141 is inclined in a step-like manner. The Fresnel lens 140 is obtained by converting the radii of curvature of the lens into prisms 143, and arraying the prisms 143 in a plane. Each of the prisms 143 formed in the Fresnel lens 140 has an inclined surface inclined with respect to the optical axis of the Fresnel lens 140, and has the function of refracting light at the inclined surface to bend the direction of travel of light.

To increase the aperture of a Fresnel lens that converges light by using only refraction, it is necessary to make the depth of wedge shapes for forming the prisms larger in the outer periphery portion of the lens. Consequently, the thickness of the lens increases, which increases the weight of the lens and also leads to a decrease in the utilization efficiency of light. Accordingly, by providing refracting prisms, which have a refractive action at their inclined surfaces, in a region close to the optical axis of the Fresnel lens, and providing reflecting prisms, which have a reflective action at their inclined surfaces, in a region away from the optical axis, the Fresnel lens can be made thinner, thereby enabling creation of a Fresnel lens with a large aperture.

A case is considered in which a Fresnel lens is used to converge light uniformly diverged and emitted from a light source to a single point. In this case, if the Fresnel lens is divided into two regions, that is, a refractive region on the inner periphery side and a reflective region on the outer periphery side, in the region between the refractive region and the reflective region, total reflection and refraction at the prism surface create a path of light that returns toward the light source. The light that returns toward the light source cannot be received by the light-receiving surface, thus resulting in loss, which decreases the utilization efficiency of light. The Fresnel lens according to the embodiment described below aims to overcome this problem, and improve the utilization efficiency of light by reducing loss of light in the Fresnel lens.

Figure 1:
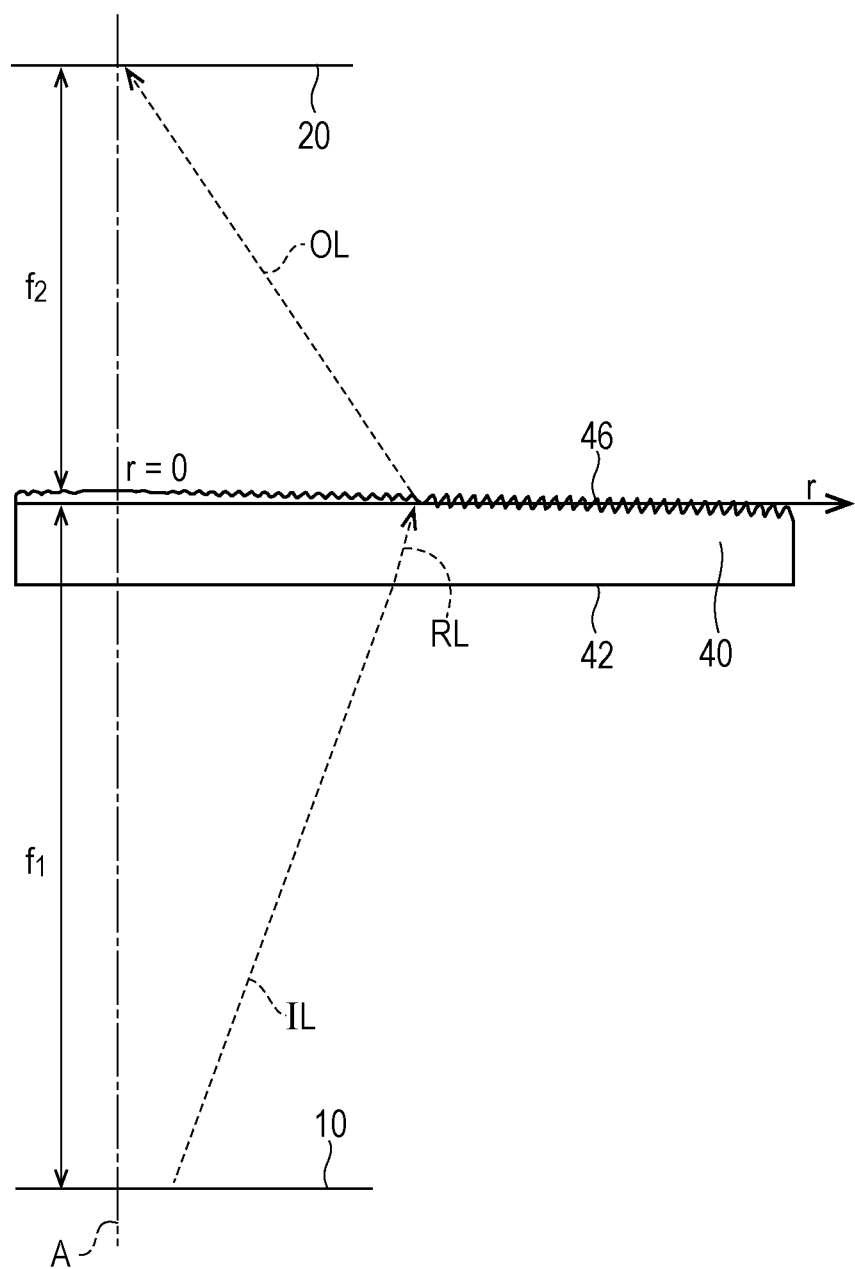
FIG. 1 schematically illustrates a general configuration of an optical system including a Fresnel lens according to the embodiment.

FIG. 1 schematically illustrates a general configuration of an optical system including a Fresnel lens 40 according to the embodiment. As illustrated in FIG. 1, the Fresnel lens 40 includes an incident surface 40, and a prism-forming surface 46. The surface on one side of the Fresnel lens 40 is formed flat to provide the incident surface 42. The prism-forming surface 46 is provided in the surface on the other side of the Fresnel lens 40 opposite to the incident surface 42. The prism-forming surface 46 has a plurality of prisms 50. The plurality of prisms 50 are formed concentrically about the optical axis A of the Fresnel lens 40. Each of the prisms 50 defines a ring-shaped lens having a narrow ring shape.

Let r represent the distance away from the optical axis A in the radial direction of the Fresnel lens 40 perpendicular to the optical axis A. For the Fresnel lens 40 according to the embodiment, predetermined values R1, R2, and R3 are set in the radial direction. These values are set so that R2 is greater than R1, and R3 is greater than R2. That is, the predetermined values R1, R2, and R3 are set so as to satisfy the relationship R1<R2<R3. The value R3 may be the radius of the Fresnel lens 40. That is, the value R3 may be the distance from the optical axis A of the Fresnel lens 40 to the outer periphery edge of the Fresnel lens 40.

The light source that produces light applied to the Fresnel lens 40 is a surface-emitting device that has a light-emitting surface 10, and uniformly diverges and emits light from the entire light-emitting surface 10. The light source used in the embodiment is a light source with no directivity, which emits light with uniform intensity in all directions, uniformly from each point on the light-emitting surface 10.

Light emitted in a planar fashion from the light-emitting surface 10 is incident on the incident surface 42 of the Fresnel lens 40. A ray of incident light IL illustrated in FIG. 1 represents an example of light that is incident on the Fresnel lens 40. The Fresnel lens 40 has a refractive index n. Accordingly, light that is incident on the incident surface 42 in a direction inclined with respect to the optical axis A is bent at the incident surface 42, and has its direction of travel changed. Refracted light RL, which has entered the Fresnel lens 40 from the incident surface 42 and has undergone refraction at the incident surface 42, passes through the interior of the Fresnel lens 40 and reaches the prism-forming surface 46.

The light that has reached the prism-forming surface 46 undergoes reflection or refraction at the prism-forming surface 46 before emerging from the Fresnel lens 40. Outgoing light OL illustrated in FIG. 1 represents an example of light emerging from the Fresnel lens 40. The outgoing light OL is received by a light-receiving element that has the light-receiving surface 20. The shape of the Fresnel lens 40 according to the embodiment is determined with the aim of improving the ratio of the quantity of light received by the light-receiving surface 20 of the light-receiving element to the quantity of light produced by the light source and emitted from the light-emitting surface 10, that is, the utilization efficiency of light.

As illustrated in FIG. 1, let $f_1$ represent the distance from the light-emitting surface 10 to the prism-forming surface 46 of the Fresnel lens 40. Further, let $f_2$ represent the distance from the prism-forming surface 46 to the light-receiving surface 20. The distance $f_1$ represents the distance between the light-emitting surface 10 and the prism-forming surface 46 in the direction along the optical axis A of the Fresnel lens 40. The distance $f_2$ represents the distance between the prism-forming surface 46 and the light-receiving surface 20 in the direction along the optical axis A of the Fresnel lens 40.

Figure 2:
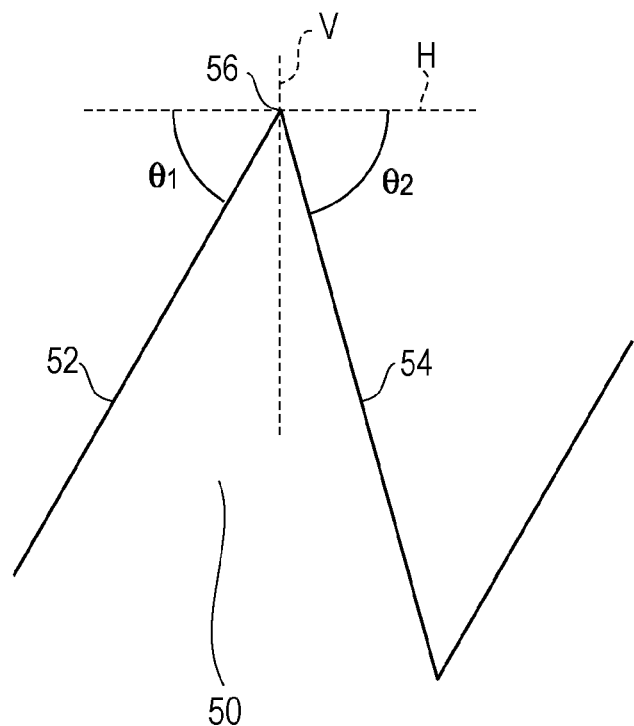
FIG. 2 schematically illustrates the angles of inclined surfaces forming each of prisms.

FIG. 2 schematically illustrates the angles of inclined surfaces forming each of the prisms 50. The prism 50 illustrated in FIG. 2 is one representative prism of the plurality of prisms formed in the prism-forming surface 46 of the Fresnel lens 40. In FIG. 2, the direction to the left in the figure represents the central direction in which the prism 50 lies close to the optical axis A of the Fresnel lens 40 and which points toward the center of the Fresnel lens 40, and the direction to the right in the figure represents the direction of the outer periphery which points away from the optical axis A of the Fresnel lens 40 and toward the outer periphery edge of the Fresnel lens 40.

An imaginary plane passing through a vertex 56 of the prism 50 and extending parallel to the optical axis A of the Fresnel lens 40 is illustrated as a vertical plane V in FIG. 2. Although the vertical plane V is depicted as a single straight line in FIG. 2, the vertical plane V is actually a cylindrical plane. An imaginary plane passing through the vertex 56 of the prism 50 and extending parallel to the incident surface 42 of the Fresnel lens 40 is illustrated as a horizontal plane H in FIG. 2. Although the horizontal plane H is depicted as a single straight line in FIG. 2, the horizontal plane H is actually a plane. Because the incident surface 42 is orthogonal to the optical axis A, the horizontal plane H is orthogonal to the optical axis A, and the vertical plane V and the horizontal plane H are orthogonal to each other.

The prism 50 is formed by two inclined surfaces. The inclined surfaces are inclined with respect to the direction along the optical axis A. Accordingly, the inclined surfaces are inclined with respect to the vertical plane V that is parallel to the optical axis A. The inclined surface located on the side close to the optical axis A and pointing toward the center of the Fresnel lens 40 defines a diverging surface 52. The inclined surface located on the side away from the optical axis A and pointing toward the outer periphery of the Fresnel lens 40 defines a converging surface 54. As illustrated in FIG. 2, the angle formed between the diverging surface 52 and the horizontal plane H is defined as $\theta_1$, and the angle formed between the converging surface 54 and the horizontal plane H is defined as $\theta_2$. Since the horizontal plane H is parallel to the incident surface 42 of the Fresnel lens 40, the angle $\theta_1$ is an angle formed between the diverging surface 52 and the incident surface 42. Likewise, the angle $\theta_2$ is an angle formed between the converging surface 54 and the incident surface 42.

Figure 3:
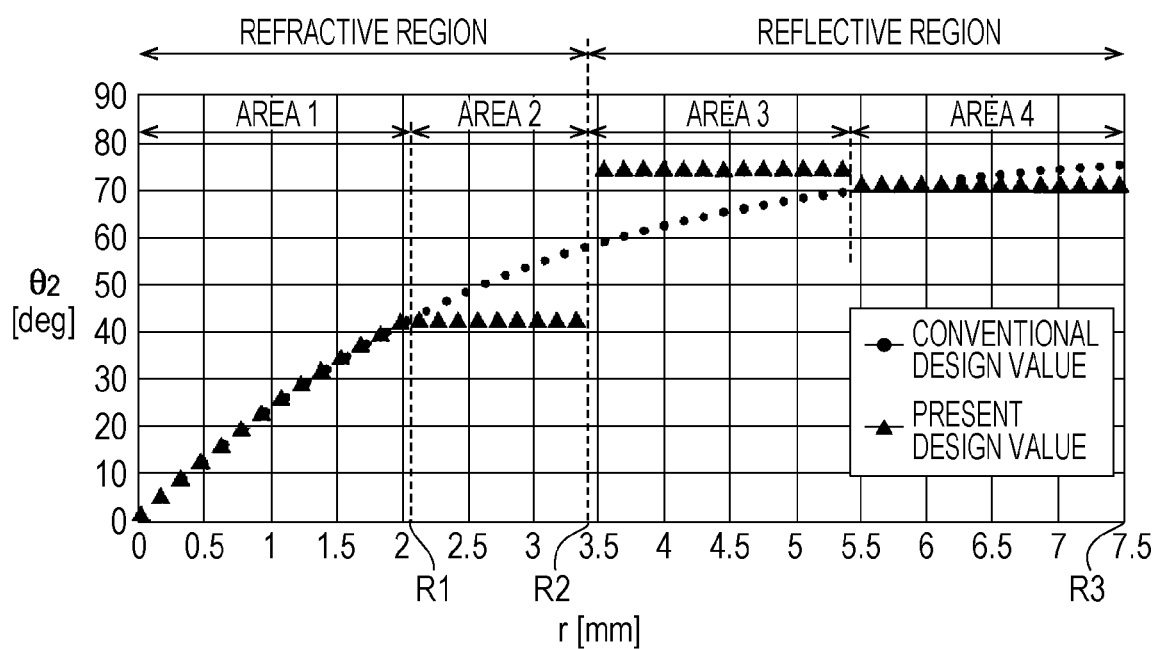
FIG. 3 is a graph illustrating design values of angle $\theta_2$.

FIG. 3 is a graph illustrating design values of the angle $\theta_2$. The horizontal axis illustrated in FIG. 3 represents the distance r away from the optical axis A with respect to the radial direction of the Fresnel lens 40. The unit of the distance r is mm. The vertical axis illustrated in FIG. 3 represents the angle $\theta_2$ formed between the converging surface 54 and the incident surface 42 of the Fresnel lens 40. The unit of the angle $\theta_2$ is degree (deg). The circular marks in FIG. 3 each indicate the design value of the angle $\theta_2$ in a conventional Fresnel lens. The triangular marks in FIG. 3 each indicate the design value of the angle $\theta_2$ in the Fresnel lens according to the embodiment.

The Fresnel lens 40 is roughly divided into two regions in the radial direction. A first region is a refractive region located on the side close to the optical axis A in the radial direction. The refracted light RL passing through the interior of the Fresnel lens 40 is refracted at the converging surface 54 of the prism 50 arranged in the refractive region before emerging from the Fresnel lens 40. A second region is a reflective region located on the side away from the optical axis A in the radial direction. The refracted light RL is reflected at the converging surface 54 of the prism 50 arranged in the reflective region before emerging from the Fresnel lens 40. The value of the distance in the radial direction from the optical axis A at the position that divides the refractive region and the reflective region is defined as R2.

The refractive region is divided into two segments in the radial direction. A first segment is Area 1 located on the side close to the optical axis A in the radial direction. A second segment is Area 2 located on the side away from the optical axis A in the radial direction. The value of the distance in the radial direction from the optical axis A at the position that divides Area 1 and Area 2 is defined as R1. In at least a part of the region where the distance r satisfies the relationship $0 < r \leq R2$, the refracted light RL is refracted at the converging surface 54.

The reflective region is divided into two segments in the radial direction. A first segment is Area 3 located on the side close to the optical axis A in the radial direction. A second segment is Area 4 located on the side away from the optical axis A in the radial direction. The value of the distance in the radial direction from the optical axis A at the position farthest away from the optical axis A in Area 4 is defined as R3. In at least a part of the region where the distance r satisfies the relationship $R2 < r \leq R3$, the refracted light RL is reflected at the converging surface 54.

The Fresnel lens 40 is divided into four areas, Area 1, Area 2, Area 3, and Area 4 in this order from the side close to the optical axis A in the radial direction.

In accordance with the conventional design value illustrated in FIG. 3, as the value of the distance r from the optical axis A becomes larger, the value of the angle $\theta_2$ also becomes larger. That is, according to the conventional design value, within the range of $0 \leq r \leq R3$, the angle $\theta_2$ is a monotonically increasing function such that as the value of r increases, the value of $\theta_2$ also increases. As opposed to this, the design value according to the embodiment is such that the angle $\theta_2$ is a different function of r in each of Areas 1 to 4. In the r-coordinate along which Areas 1 to 4 are divided from each other in the horizontal axis in FIG. 3, the present design value of the angle $\theta_2$ illustrated in FIG. 3 is discontinuous, or is continuous but does not have smoothness.

As illustrated in FIG. 3, in Area 1, the angle $\theta_2$ according to the present design is the same function of r as the conventional design value, and is a monotonically increasing function such that $\theta_2$ increases with an increase in r. In Area 2, the angle $\theta_2$ according to the present design is set to a constant value. At the position of r=R1 that divides Area 1 and Area 2, the graph indicating the relationship between the distance r and the angle $\theta_2$ is bent. Although the angle $\theta_2$ is continuous in Area 1 and Area 2, and the angle $\theta_2$ is continuous at the point r=R1, a cusp is formed at r=R1.

The monotonically increasing function representing the relationship between the distance r and the angle $\theta_2$ in Area 1 is defined as a function f(x) with x as a variable. Within Area 1 (that is, within the range of $0 \leq r \leq R1$) on the inner periphery side of the bent region of the Fresnel lens 40, the value of the angle $\theta_2$ determined from this monotonically increasing function, and the value of the angle $\theta_2$ according to the present design coincide. That is, in the range of $0 \leq r < R1$, the relationship $\theta_2 = f(r)$ holds.

Within Area 2 (that is, within the range of $R1 < r \leq R2$) on the outer periphery side of the bent region, the value of the angle $\theta_2$ according to the present design is smaller than the value of the angle $\theta_2$ determined from this monotonically increasing function. Further, within Area 2, the angle $\theta_2$ is determined so as not to fall below the value of the angle $\theta_2$ when r=R. That is, in the range of $R1 \leq r < R2$, the relationship $f(R1) \leq \theta_2 < f(r)$ holds. The Fresnel lens 40 may be designed so that the value of the angle $\theta_2$ in Area 2 is constant as illustrated in FIG. 3. Alternatively, the Fresnel lens 40 may be designed so that the rate of change of the angle $\theta_2$ with respect to the distance r is smaller in Area 2 than in Area 1.

In order for the Fresnel lens 40 to reflect the refracted light RL at the converging surface 54 within a range in which the distance r in the radial direction from the optical axis A is small, it is necessary to make the angle $\theta_2$ larger. That is, when the boundary between the refractive region and the reflective region is made closer to the optical axis A, and the value R2 is made smaller, the angle $\theta_2$ needs to be made larger. Consequently, the thickness of the Fresnel lens 40 becomes larger. When attempting to keep the thickness of the Fresnel lens 40 small, the diverging surface 52 becomes larger, and the amount of outgoing light OL not converging to the light-receiving surface 20 increases, thus resulting in increased loss of light and decreased utilization efficiency of light.

Therefore, for the Fresnel lens 40, it is required to make the value R2 somewhat large in order to secure a sufficient refractive region. To that end, the refractive region is required to include both Areas 1 and 2. In Area 1, the angle $\theta_2$ increases in accordance with the monotonically increasing function with the distance r as a variable. In Area 2, the amount of increase of the angle $\theta_2$ with an increase in the distance r is kept lower than that according to this monotonically increasing function. In Area 2, the increase of the angle $\theta_2$ is small even when the distance r increases. By making the value of $\theta_2$ smaller in Area 2, the incidence angle of light on the converging surface 54 can be made smaller, thereby allowing light to be converged to the light-receiving surface 20 by using refraction at the converging surface 54.

By making the diverging surface 52 smaller while keeping the thickness of the Fresnel lens 40 small, the quantity of light not converging to the light-receiving surface 20 can be reduced to thereby minimize loss of light. Moreover, the quantity of light that is reflected and refracted at the prism-forming surface 46 of the Fresnel lens 40 to emerge toward the light-emitting surface 10 can be also reduced, thereby further minimizing loss of light. As a result, it is possible to improve the utilization efficiency of light by converging more light to the light-receiving surface 20 while keeping the thickness of the Fresnel lens 40 small.

The shape of the prism 50 in Area 1 may be the shape of a known refractive lens. For example, once the refractive index n of the Fresnel lens 40 and the distance $f_1$ are set, the angles $\theta_1$ and $\theta_2$ at the distance r may be determined so that the following relationship expressed by Equation (1) below holds between the distance r and the angles $\theta_1$ and $\theta_2$.

[Math. 1]
$$n \cdot \cos(\pi - \theta_1 - \theta_2) = \cos\left\{(\pi - \theta_1 - \theta_2) - \tan^{-1}\left(\frac{r}{f_1}\right)\right\} \quad (1)$$

Further, for example, once the refractive index n and the distances $f_1$ and $f_2$ are set, the angle $\theta_2$ at the distance r may be determined so that the following relationship expressed by Equation (2) below holds between the distance r and the angle $\theta_2$.

[Math. 2]
$$\theta_2 = \frac{\pi}{2} - \arctan\left[\frac{n \cdot \sin\left\{\arctan\left(\frac{f_2}{r}\right)\right\} - \sin\left\{\arctan\left(\frac{f_1}{r}\right)\right\}}{n \cdot \cos\left\{\arctan\left(\frac{f_2}{r}\right)\right\} - \cos\left\{\arctan\left(\frac{f_1}{r}\right)\right\}}\right] \quad (2)$$

At the boundary between Area 2 and Area 3 illustrated in FIG. 3, that is, at the boundary between the refractive region and the reflection region of the Fresnel lens 40, the value of the angle $\theta_2$ is discontinuous. In accordance with the present design value illustrated in FIG. 3, the angle $\theta_2$ is set to a constant value in Area 2, and the angle $\theta_2$ is also set to a constant value in Area 3, with the angle $\theta_2$ in Area 3 being significantly larger than the angle $\theta_2$ in Area 2.

The value of the angle $\theta_2$ is discontinuous also at the boundary between Area 3 and Area 4. In accordance with the present design value illustrated in FIG. 3, the angle $\theta_2$ is set to a constant value in Area 3, and the angle $\theta_2$ is also set to a constant value in Area 4, with the angle $\theta_2$ in Area 4 being significantly smaller than the angle $\theta_2$ in Area 3. The value of the angle $\theta_2$ in Area 4 is set to an intermediate value between the value of the angle $\theta_2$ in Area 2 and the value of the angle $\theta_2$ in Area 3.

The angle $\theta_2$ in the reflective region is set in this way. As a result, the value of the angle $\theta_2$ when the distance r=R2 is larger than the value of the angle $\theta_2$ when the distance r=R3. In the reflective region, the position of r=R2 is the edge on the innermost periphery side closest to the optical axis A, and the position of r=R3 is the edge on the outermost periphery side farthest away from the optical axis A. In the reflective region, the angle $\theta_2$ in Area 4 located on the outer side is smaller than the angle $\theta_2$ in Area 3 located on the inner side.

Within the reflective region, in an area close to the optical axis A, when the angle $\theta_2$ is small, the proportion of light that is not reflected at the converging surface 54 and hence is not converged to the light-receiving surface 20 increases. In an area far from the optical axis A, a large angle $\theta_2$ causes some quantity of light to be not fully converged. Accordingly, when the angle $\theta_2$ is set so that the angle $\theta_2$ in Area 3 is smaller than the angle $\theta_2$ in Area 4, light can be effectively reflected at the converging surface 54 in the reflective region, thereby allowing light to be effectively converged to the light-receiving surface 20.

The angle $\theta_2$ may not necessarily be constant in each of Areas 3 and 4 within the reflective region. For example, the angle $\theta_2$ may vary in accordance with a predetermined function of r within the reflective region. In this case as well, the angle $\theta_2$ may be determined so that, as a result of variation of the angle $\theta_2$, the value of the angle $\theta_2$ at r=R2 is larger than the value of the angle $\theta_2$ at the distance r=R3. For example, the angle $\theta_2$ may undergo a monotonic decrease in a broad sense in the reflective region.

Figure 4:
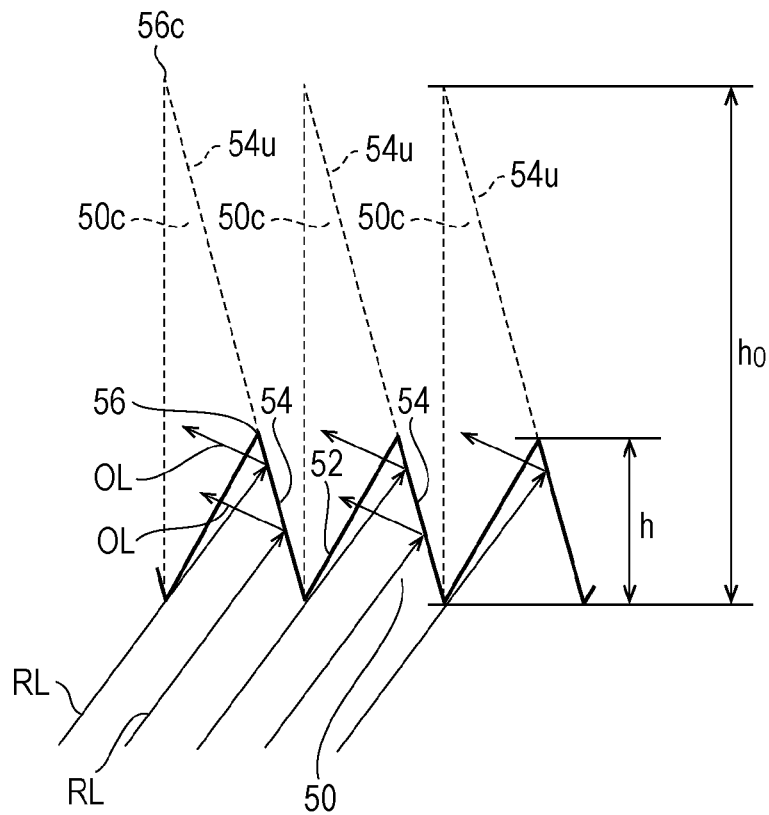
FIG. 4 is a schematic illustration about the upper limit of the design value of angle $\theta_1$.

FIG. 4 is a schematic illustration about the upper limit of the design value of angle $\theta_1$. In FIG. 4, the shape of the prism 50 according to the embodiment is indicated by solid lines. In FIG. 4, the shape of an imaginary conventional prism 50c is also indicated by dotted lines. The prism 50c has the same angle $\theta_2$ as the prism 50 according to the embodiment, with the angle $\theta_1$=90°.

A comparison between the imaginary prism 50c and the prism 50 illustrated in FIG. 4 indicates that, in the imaginary prism 50c, the angle $\theta_1$ is made larger so that the surface area of the converging surface is larger than that of the converging surface 54 of the prism 50. In comparison to a height h that is the distance from the base portion of the prism 50 to the vertex 56, a height $h_0$ that is the distance to a vertex 56c of the imaginary prism 50c is significantly larger. The greater the height of a prism, the greater the required depth of a wedge shape for forming the prism. Consequently, it is difficult to manufacture the Fresnel lens, and it is also difficult to accurately measure the shape of the Fresnel lens after the manufacture.

Therefore, it is desirable to determine the angle $\theta_1$ so that the relationship $\theta_1$<90° holds. The Fresnel lens 40 including the prism 50 having the angle $\theta_1$ specified in this way is easy to manufacture because the angle of the wedge shape forming the prism 50 does not become small, and also facilitates precise measurement of the shape of the Fresnel lens 40 after the manufacture.

FIG. 4 also illustrates refracted light RL that passes through the interior of the Fresnel lens 40, and outgoing light OL that emerges from the Fresnel lens 40 as the refracted light RL is reflected at the converging surface 54. The incidence angle of light on the incident surface 42 is relatively larger in the outer periphery portion than in the inner periphery portion of the Fresnel lens 40. As indicated by the refracted light RL in FIG. 4, light incident on the Fresnel lens 40 at a large angle of inclination with respect to the incident surface 42 is reflected within an area from the lower end portion of the converging surface 54 of the prism 50 to the vertex 56. The refracted light RF illustrated in FIG. 4 does not reach the vertex 56 of the prism 50.

Therefore, the portion of the converging surface of the imaginary prism 50c which extends to the distal end side beyond the vertex 56 is an unnecessary converging surface 54u. Because the refracted light RL does not strike the unnecessary converging surface 54u, the convergence efficiency of light with which light is reflected by the converging surface 54 of the prism 50 and converged to the light-receiving surface 20 does not change irrespective of the presence or absence of the unnecessary converging surface 54u. Even if the angle $\theta_1$ is set smaller than 90°, and the converging surface 54 is made smaller by making the angle $\theta_1$ smaller, there is no decrease in the convergence efficiency of light by the prism 50. Therefore, the thickness of the Fresnel lens 40 can be made small, and also the convergence efficiency of light to the light-receiving surface 20 can be maintained.

Figure 5:
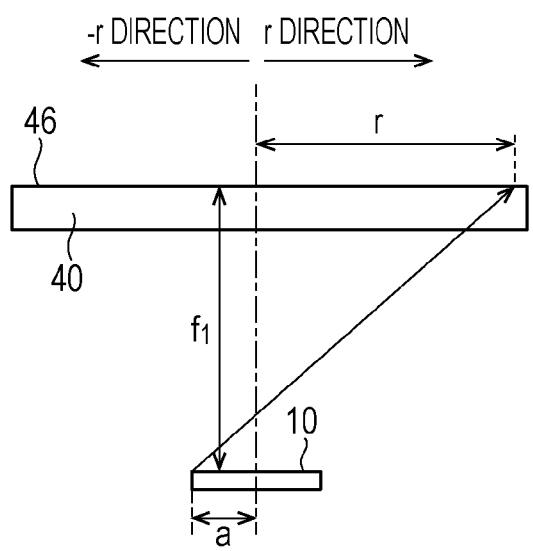
FIG. 5 is a schematic illustration about the lower limit of the design value of angle $\theta_1$.

FIG. 5 is a schematic illustration about the lower limit of the design value of the angle $\theta_1$. As illustrated in FIG. 5, one direction along a straight line extending in the radial direction of the Fresnel lens 40 is defined as r direction, and the other direction is defined as −r direction. The r direction and the −r direction are opposite to each other along the straight line extending in the radial direction of the Fresnel lens 40.

A distance r represents the distance away from the optical axis A in the r direction mentioned above. Further, let a represent the distance between the optical axis A, and the end portion located farthest away from the optical axis A in the −r direction of the light-emitting surface 10 that emits light from the entirety of the surface. Among rays of light that are incident on the position of the Fresnel lens 40 at the distance r in the r direction, a ray of light emitted from the end portion of the light-emitting surface 10 located farthest away from the optical axis A in the −r direction is incident on the Fresnel lens 40 at the largest angle of incidence. At this time, by using the distances r, a, and $f_1$, the lower limit of the angle $\theta_1$ can be expressed as $\arctan\{f_1/(r+a)\}$. Referring to FIG. 4 and FIG. 5, the angle $\theta_1$ may be set within a range in which the relationship $\arctan\{f_1/(r+a)\}\theta_1<90°$ holds.

As a result of the angle $\theta_1$ being set in this way, all of the light emitted from the light-emitting surface 10 can be made incident on the position of the Fresnel lens 40 at the distance r in the r direction. Therefore, the quantity of light converged to the light-receiving surface 20 can be increased to thereby improve the utilization efficiency of light. In addition, as mentioned above, the Fresnel lens 40 can be made thinner and the Fresnel lens 40 with a large aperture can be easily formed. Moreover, manufacture of the Fresnel lens 40 is facilitated, and the shape of the Fresnel lens 40 after the manufacture can be also measured with improved precision.

While the embodiment of the present invention has been described above, the embodiment disclosed herein is intended to be illustrative in all respects and not restrictive. The scope of the invention is, therefore, defined by the appended claims rather than by the foregoing description. All changes that come within the meaning and range of equivalency of the claims are to be embraced within their scope.

INDUSTRIAL APPLICABILITY

The Fresnel lens according to the present invention proves particularly advantageous when applied to a condenser lens used in the light-receiving optical system of an optical detector used for detecting the intensity of light.

REFERENCE SIGNS LIST 10 light-emitting surface
20 light-receiving surface
40 Fresnel lens
42 incident surface
46 prism-forming surface
50 prism
52 diverging surface
54 converging surface
56 vertex
A optical axis
a, $f_1$, $f_2$, r distance
IL incident light
n refractive index
OL outgoing light
RL refracted light
$\theta_1$, $\theta_2$ angle

The invention claimed is:

1. A Fresnel lens comprising an incident surface that is flat, and a prism-forming surface that has a plurality of prisms, the prism-forming surface being provided on a side of the Fresnel lens opposite to the incident surface, wherein:
   each of the prisms has a converging surface that is located on a side away from an optical axis of the Fresnel lens;
   when a distance away from the optical axis in a radial direction of the Fresnel lens is defined as r, and predetermined values R1, R2, and R3 in the radial direction are set so as to satisfy R1<R2<R3,
      a region that satisfies $0 \leq r \leq R2$ forms a refractive region where light that passes through an interior of the Fresnel lens is refracted at the converging surface, and
      a region that satisfies $R2 < r \leq R3$ forms a reflective region where the light is reflected at the converging surface; and
   in a range of $0 \leq r < R1$, a relationship $\theta_2 = f(r)$ holds, and
   in a range of $R1 \leq r < R2$, a relationship $f(R1) \leq \theta_2 < f(r)$ holds,
   where $\theta_2$ represents an angle formed between the incident surface and the converging surface, and f(x) represents a monotonically increasing function with x as a variable.

2. The Fresnel lens according to claim 1, wherein a value of $\theta_2$ when r=R2 is larger than a value of $\theta_2$ when r=R3.

3. The Fresnel lens according to claim 1, wherein:
   each of the prisms has a diverging surface that is located on a side close to the optical axis; and
   a relationship $\theta_1 < 90°$ holds, where $\theta_1$ represents an angle formed between the incident surface and the diverging surface.

4. The Fresnel lens according to claim 3, wherein:
   directions opposite to each other along a straight line extending in the radial direction of the Fresnel lens are defined as an r direction and −r direction; and
   a relationship $\arctan\{f_1/(r+a)\}\theta_1<90°$ holds,
   where r represents a distance away from the optical axis in the r direction, $f_1$ represents a distance to the prism-forming surface from a light-emitting surface that emits incident light incident on the incident surface, and a represents a distance between the optical axis and an end portion of the light-emitting surface that is located farthest away from the optical axis in the −r direction.

* * * * *